United States Patent
Mizoguchi

(10) Patent No.: US 11,361,199 B2
(45) Date of Patent: Jun. 14, 2022

(54) TRAVELING ENVIRONMENT RECOGNITION APPARATUS

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 16/909,044

(22) Filed: Jun. 23, 2020

(65) Prior Publication Data
US 2021/0089843 A1 Mar. 25, 2021

(30) Foreign Application Priority Data
Sep. 24, 2019 (JP) .............................. JP2019-173458

(51) Int. Cl.
*G06K 9/62* (2022.01)
*G01S 13/931* (2020.01)
(Continued)

(52) U.S. Cl.
CPC .......... *G06K 9/6288* (2013.01); *G01S 13/931* (2013.01); *G06V 10/22* (2022.01); *G06V 20/56* (2022.01); *G06V 2201/07* (2022.01)

(58) Field of Classification Search
None
See application file for complete search history.

(56) References Cited

U.S. PATENT DOCUMENTS

| 6,265,991 B1* | 7/2001 | Nishiwaki | G01S 7/295 340/903 |
| 11,017,513 B1* | 5/2021 | Yarlagadda | G06K 9/6293 |

(Continued)

FOREIGN PATENT DOCUMENTS

| DE | 102008001672 B4 * | 3/2022 | B60W 30/16 |
| JP | 2006-292475 A | 10/2006 | |

OTHER PUBLICATIONS

Tasdelen, Elif Aksu, and Volkan Sezer. "Comparison and application of multiple 3D LIDAR fusion methods for object detection and tracking." 2020 5th International Conference on Robotics and Automation Engineering (ICRAE). IEEE, 2020. (Year: 2020).*

(Continued)

*Primary Examiner* — Michelle M Entezari
(74) *Attorney, Agent, or Firm* — McDermott Will & Emery LLP

(57) ABSTRACT

A traveling environment recognition apparatus includes a first detector that detects an object in a first region outside a vehicle, a second detector that detects an object in a second search region that at least partly overlaps with the first region, a determiner that determines whether two objects respectively detected by the two detectors are a same object, in an overlapping region of the search regions; and a recognizer that integrates the detected objects, and to recognize the detected objects as one fusion object. The recognizer compares a threshold with a parameter based on distances from the vehicle to the detected objects, to recognize the fusion object using a worst value of detection results of the detected objects when the detected objects are near the vehicle, and recognize the fusion object using a mean value of the detection results when the detected objects are far from the vehicle.

16 Claims, 6 Drawing Sheets

(51) Int. Cl.
    *G06V 10/22*           (2022.01)
    *G06V 20/56*           (2022.01)

(56) References Cited

U.S. PATENT DOCUMENTS

| | | | | |
|---|---|---|---|---|
| 11,267,464 B2* | 3/2022 | Luo | ............. | B60W 30/095 |
| 2003/0210172 A1* | 11/2003 | Pleva | ............. | H01Q 13/10 |
| | | | | 342/70 |
| 2007/0198189 A1* | 8/2007 | Herbin | ............. | G06V 20/58 |
| | | | | 701/300 |
| 2008/0136612 A1* | 6/2008 | Machii | ............. | G01S 17/931 |
| | | | | 340/435 |
| 2008/0169966 A1* | 7/2008 | Tsuchihashi | ............. | G01S 13/931 |
| | | | | 342/70 |
| 2010/0225764 A1* | 9/2010 | Nizko | ............. | G01S 7/4004 |
| | | | | 348/152 |
| 2014/0232537 A1* | 8/2014 | Delprat | ............. | G01S 13/751 |
| | | | | 340/435 |
| 2015/0161881 A1* | 6/2015 | Takemura | ............. | G06K 9/00798 |
| | | | | 348/148 |
| 2016/0325702 A1* | 11/2016 | Nakamura | ............. | B60R 21/0134 |
| 2017/0001642 A1* | 1/2017 | Kumai | ............. | B62D 15/025 |
| 2017/0098131 A1* | 4/2017 | Shashua | ............. | G06T 7/215 |
| 2017/0358102 A1* | 12/2017 | Akiyama | ............. | G06V 20/58 |
| 2019/0294889 A1* | 9/2019 | Sriram | ............. | H04N 5/247 |
| 2020/0326721 A1* | 10/2020 | Buerkle | ............. | G05D 1/0217 |
| 2020/0349378 A1* | 11/2020 | Raghoebardajal | ... | G06V 10/245 |
| 2021/0006713 A1* | 1/2021 | Iino | ............. | G06T 7/70 |

OTHER PUBLICATIONS

DE 102008001672 B4 [Machine Translation] (Year: 2022).*
Pang, Su, Daniel Morris, and Hayder Radha. "CLOCs: Camera-LiDAR object candidates fusion for 3D object detection." 2020 IEEE/RSJ International Conference on Intelligent Robots and Systems (IROS). IEEE, 2020. (Year: 2020).*
Zhao, Xiangmo, et al. "Fusion of 3D LIDAR and camera data for object detection in autonomous vehicle applications." IEEE Sensors Journal 20.9 (2020): 4901-4913. (Year: 2020).*
Batz, Thomas, Kym Watson, and Jurgen Beyerer. "Recognition of dangerous situations within a cooperative group of vehicles." 2009 IEEE Intelligent Vehicles Symposium. IEEE, 2009. (Year: 2009).*

* cited by examiner

TRAVELING ENVIRONMENT RECOGNITION APPARATUS

CROSS-REFERENCE TO RELATED APPLICATIONS

The present application claims priority from Japanese Patent Application No. 2019-173458 filed on Sep. 24, 2019, the entire contents of which are hereby incorporated by reference.

BACKGROUND

The technology relates to a traveling environment recognition apparatus configured to detect a same target in a traveling environment outside a vehicle by using a plurality of sensors, and the like.

In recent years, a driving assist apparatus for assisting driving operation of a driver has been put to a practical use, for the purpose of reducing a burden of the driving operation of the driver and achieving improvement in safety. For such a kind of driving assist apparatus, various kinds of techniques have been developed. The techniques include a driving assist mode for performing steering assist control and acceleration/deceleration control on the premise of independent driving operation by a driver and a driving assist mode (what is called an automatic driving mode) for causing a vehicle to travel without requiring any driving operation by a driver.

In addition, various proposals have been made for a traveling environment recognition apparatus to be used in the above-described driving assist apparatus. In such a kind of traveling environment recognition apparatus, it is important to accurately recognize a traveling environment outside the vehicle especially when traveling is performed under the automatic driving mode.

In view of the above, in such a kind of traveling environment recognition apparatus, a technique for detecting the same target outside the vehicle with a plurality of sensors (a stereo camera, a monocular camera, a millimeter wave radar, a sonar, etc.), integrating the solid objects that are detected by the respective sensors and determined to be the same object, and recognizing the integrated solid objects as a fusion solid object has been proposed. Japanese Unexamined Patent Application Publication (JP-A) No. 2006-292475 (Patent Document 1), for example, discloses a technique in which a judging unit is provided, and the judging unit is configured to judge that a solid object detected by a millimeter wave radar and a solid object detected by a stereo camera are the same solid object when a relation between position information of the object (solid object) detected by the millimeter wave radar and position information of the solid object detected by the stereo camera satisfies a judgment criterion, and when a distance to each of the solid objects is long, the judgment criterion is changed by changing a threshold so as to enable the judgment on whether the solid objects are the same solid object to be easily made. Furthermore, JP-A No. 2006-292475 discloses a technique of using radar information for obtaining a distance and a relative speed of an integrated fusion target (fusion solid object) and using information from stereo images for obtaining other information on the integrated fusion target.

SUMMARY

An aspect of the technology provides a traveling environment recognition apparatus. The apparatus includes a first detector, a second detector, a determiner, and a fusion solid. The first detector is configured to detect a solid object that is in a first search region set outside of a vehicle. The second detector is configured to detect a solid object that is in a second search region set outside of the vehicle such that at least a part of the second search region overlaps with the first search region. The determiner is configured to determine whether a first detected solid object detected by the first detector and a second detected solid object detected by the second detector are a same solid object, in an overlapping region of the first search region and the second search region. The fusion solid object recognizer is configured to integrate the first detected solid object and the second detected solid object which are determined to be the same solid object by the determiner, and to recognize the integrated first and second detected solid objects as one fusion solid object. The fusion solid object recognizer compares a set threshold with a parameter based on a distance from the vehicle to the first detected solid object and a distance from the vehicle to the second detected solid object, to recognize the fusion solid object using a worst value of respective detection results of the first and second detected solid objects when determining that the first detected solid object and the second detected solid object exist near the vehicle, and recognize the fusion solid object using a mean value of the respective detection results of the first and second detected solid objects when determining that the first detected solid object and the second detected solid object are far from the own vehicle.

An aspect of the technology provides a traveling environment recognition apparatus. The apparatus includes first detector, second detector, and circuitry. The first detector is configured to detect a solid object that is in a first search region set outside a vehicle. The second detector is configured to detect a solid object that is in a second search region set outside of the vehicle such that at least a part of the second search region overlaps with the first search region. The circuitry is configured to determine whether a first detected solid object detected by the first detector and a second detected solid object detected by the second detector are a same solid object, in an overlapping region of the first search region and the second search region. The circuitry is configured to integrate the first detected solid object and the second detected solid object which are determined to be the same solid object, and to recognize the integrated first and second detected solid objects as one fusion solid object. The circuitry compares a set threshold with a parameter based on a distance from the vehicle to the first detected solid object and a distance from the vehicle to the second detected solid object, to recognize the fusion solid object using a worst value of respective detection results of the first and second detected solid objects when determining that the first detected solid object and the second detected solid object are near the vehicle, and recognize the fusion solid object using a mean value of the respective detection results of the first and second detected solid objects when determining that the first detected solid object and the second detected solid object are far from the own vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

As in the technique disclosed in the above-described Patent Document 1, if the fusion solid object is recognized by selectively using individual detection information, a safety margin for the fusion solid object is not considered especially in the vicinity of the own vehicle, which results in the possibility that the advantage of detecting the same solid object with a plurality of sensors will be lost.

In view of the above circumstance, it is desirable to provide a traveling environment recognition apparatus capable of recognizing a fusion solid object by efficiently and effectively using detection information obtained by a plurality of sensors.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
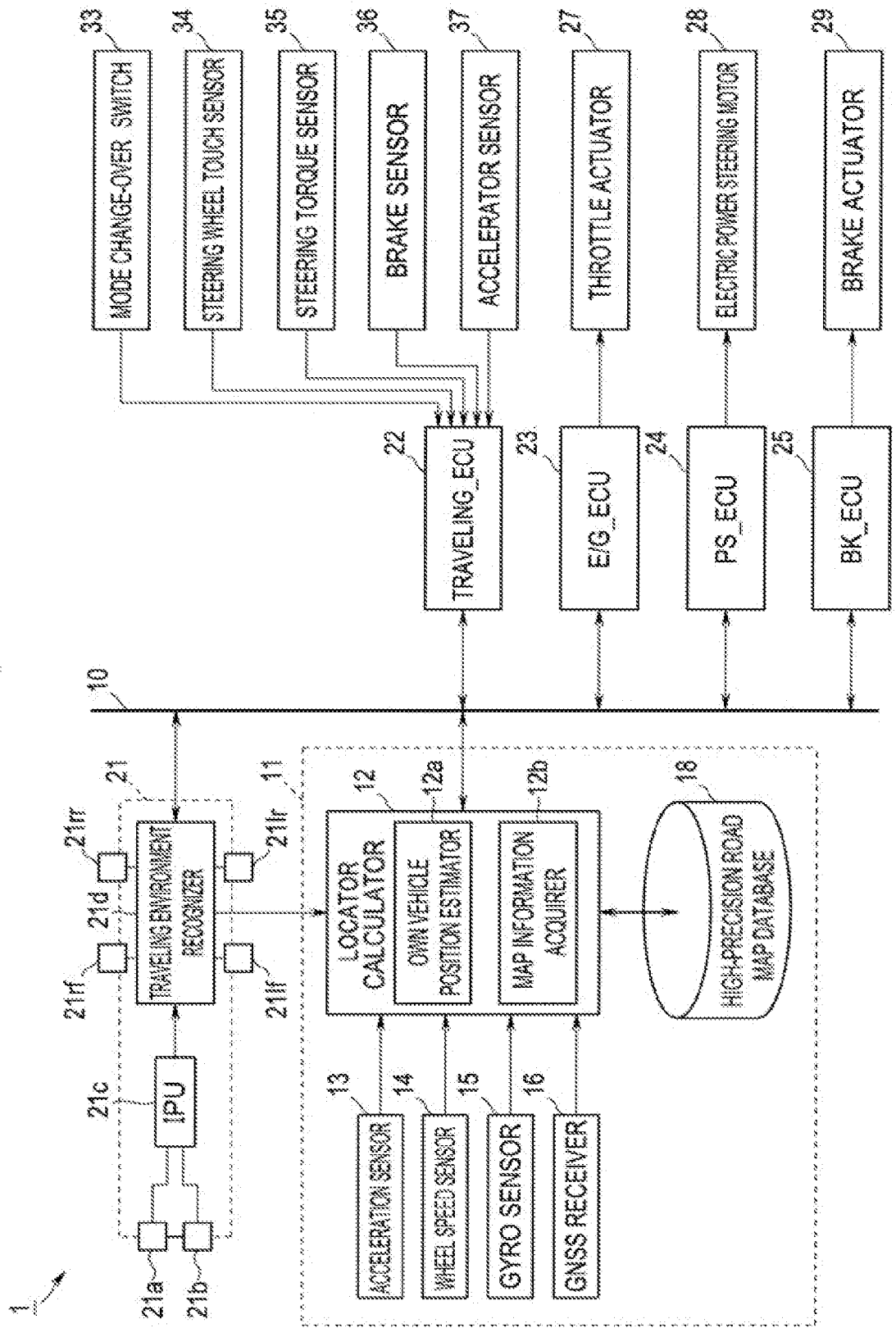
FIG. 1 is a configuration diagram of a vehicle driving assist apparatus.

A driving assist apparatus 1 illustrated in FIG. 1 is mounted on a vehicle (own vehicle) 100 such as an automobile. The driving assist apparatus 1 includes a locator unit 11 and a camera unit 21 as a sensor unit (traveling environment recognition apparatus) for recognizing a traveling environment outside the vehicle, and both of the units 11, 21 configure completely independent multiplex systems that do not depend on each other. In addition, the driving assist apparatus 1 includes a traveling control unit (hereinafter, referred to as "traveling_ECU") 22, an engine control unit (hereinafter, referred to as "E/G_ECU") 23, a power steering control unit (hereinafter, referred to as "PS_ECU") 24, and a braking control unit (hereinafter, referred to as "BK_ECU") 25. The respective control units 22 to 25 are coupled with the locator unit 11 and the camera unit 21 through an in-vehicle communication line 10 such as a CAN (Controller Area Network).

The locator unit 11 is configured to estimate an own vehicle position on a road map, and includes a locator calculator 12 configured to estimate the own vehicle position. Sensors required for estimating the position of the own vehicle 100 (own vehicle position) are coupled to the input side of the locator calculator 12. The sensors include a longitudinal acceleration sensor 13 configured to detect a longitudinal acceleration of the own vehicle 100, a wheel speed sensor 14 configured to detect a rotational speed of each of right front wheel, left front wheel, right rear wheel, and left rear wheel, a gyro sensor 15 configured to detect an angular speed or an angular acceleration of the own vehicle 100, and a GNSS (Global Navigation Satellite System) receiver 16 configured to receive positioning signals transmitted from a plurality of positioning satellites.

The locator calculator 12 is coupled with a high-precision road map database 18 as a storage unit. The high-precision road map database 18 is a large-capacity storage medium such as an HDD in which the high-precision road map information (dynamic map) is stored. The high-precision road map information includes, as lane data required for performing automatic driving, lane width data, lane center position coordinate data, advancing azimuth angle data of the lane, a regulation speed, and the like. The lane data is stored for each of lanes on the road map at intervals of several meters.

The locator calculator 12 includes an own vehicle position estimator 12a configured to estimate an own vehicle position, and a map information acquirer 12b. The map information acquirer 12b acquires, based on a destination set by a driver when performing automatic driving, for example, route map information from the current position to the destination, from the map information stored in the high-precision road map database 18.

In addition, the map information acquirer 12b transmits the acquired route map information (lane data on the route map) to the own vehicle position estimator 12a. The own vehicle position estimator 12a acquires position coordinates of the own vehicle 100 based on the positioning signal received by the GNSS receiver 16. Furthermore, the own vehicle position estimator 12a map-matches the acquired position coordinates on the route map information, estimates the own vehicle position on the road map and identifies the traveling lane, and acquires the road curvature of the center of the traveling lane stored in the road map data.

In the environment such as traveling in a tunnel in which an effective positioning signal cannot be received from the positioning satellite due to the lowered sensitivity of the GNSS receiver 16, the own vehicle position estimator 12a switches to the autonomous navigation in which the own vehicle position is estimated based on the vehicle speed obtained based on the wheel speed detected by the wheel speed sensor 14, the angular speed detected by the gyro sensor 15, and the longitudinal acceleration detected by the longitudinal acceleration sensor 13, to estimate the own vehicle position on the road map.

The camera unit 21 is fixed to an upper center of a front part in a cabin of the vehicle, and includes an in-vehicle camera (stereo camera) having a main camera 21a and a sub camera 21b disposed at symmetric positions across the center in the vehicle width direction, an image processing unit (IPU) 21c, and a traveling environment recognizer 21d.

The IPU 21c performs predetermined image processing on forward traveling environment image information ahead of the own vehicle 100 based on the images picked up by both of the cameras 21a, 21b, to generate forward traveling environment image information (distance image information) including distance information obtained based on the deviation amount of the positions of the corresponding targets in the images picked up by the cameras 21a, 21b.

The traveling environment recognizer 21d obtains the curvatures [1/m] of lane markers marking the left and right of the traveling path (own vehicle traveling path) on which the own vehicle 100 travels and the width between the left lane marker and the right lane marker (lane width), based on the distance image information received from the IPU 21c. Various methods of obtaining the curvatures and the lane width have been known. For example, the traveling environment recognizer 21d identifies the left lane marker and the right lane marker by binarization processing using a luminance difference based on the forward traveling environment image information and obtains the curvatures of the left and right lane markers for each predetermined section based on a curve approximation formula by the least-squares method. The traveling environment recognizer 21d further calculates the lane width based on the difference between the curvature of the left lane marker and the curvature of the right lane marker.

Then, the traveling environment recognizer 21d obtains the road curvature of the lane center based on the curvatures of the left and right lane markers and the lane width, and further calculates the lateral position deviation of the own vehicle 100, with the lane center as a reference. More accurately, the traveling environment recognizer 21d calculates an own vehicle position deviation Xdiff which is a distance from the lane center to the center in the vehicle width direction of the own vehicle 100.

Furthermore, the traveling environment recognizer 21d performs a predetermined pattern matching on the distance image information, to recognize a guardrail, a curbstone, and a solid object that exist along the road. When recognizing the solid object, the traveling environment recognizer 21d recognizes, for example, the type of the solid object, the distance to the solid object, the speed of the solid object, and the relative speed of the solid object and the own vehicle 100.

Furthermore, the traveling environment recognizer 21d is coupled with a plurality of radars (for example, a left front side radar 211f, a right front side radar 21rf, a left rear side radar 211r, and right rear side radar 21rr).

Figure 2:
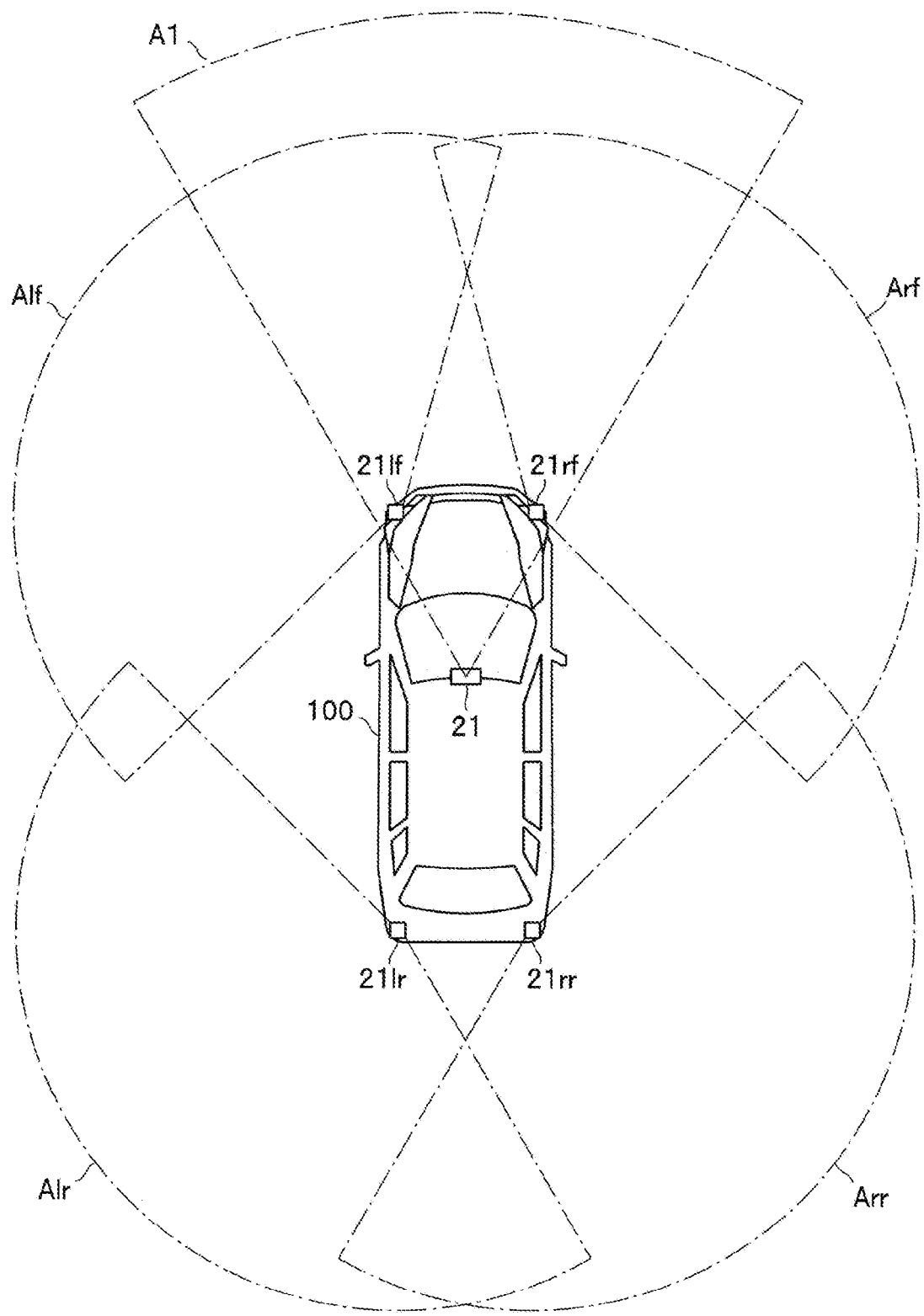
FIG. 2 is an explanatory view illustrating a search region of an in-vehicle camera and a search region of each of radars.

The left front side radar 211f and the right front side radar 21rf are millimeter wave radars, for example, and disposed respectively on left side part and right side part of a front bumper of the own vehicle. The left front side radar 211f and the right front side radar 21rf respectively monitor a diagonally left front and lateral region Alf and a diagonally right front and lateral region Arf of the own vehicle 100 (see FIG. 2) which are difficult to be recognized in the image obtained by the above-described in-vehicle camera.

The left rear side radar 211r and the right rear side radar 21rr are millimeter wave radars, for example, and disposed respectively at the left side part and the right side part of the rear bumper of the own vehicle. The left rear side radar 211r and the right rear side radar 21rr monitor regions Alr, Arr (see FIG. 2) from the lateral side to the rear side of the own vehicle 100, which cannot be monitored by the above-described left front side radar 211f and right front side radar 21rf.

In the present embodiment, each of the millimeter wave radars that configures each of the radars detects mainly a solid object such as a parallel traveling vehicle, a following vehicle, or the like, as a radar object (radar OBJ), by analyzing reflected waves created by the electric waves output from the millimeter wave radar being reflected by an object. In one embodiment, the each of the radars detects, as information related to the radar object, a width of the solid object, a position of a representative point P of the solid object (relative position with respect to the own vehicle 100), a speed of the solid object, and the like.

In the present embodiment, a front region A1 to be detected by the in-vehicle camera and the diagonally left and right front and lateral regions Alf, Arf to be detected respectively by the left front side radar 211f and the right front side radar 21rf are set so as to partially overlap with each other. In one embodiment, when it is supposed that the front region A1 is a first search region and the diagonally left and right front and lateral regions Alf, Arf are a second search region, the in-vehicle camera may serve as a "first detector", and the left front side radar 211f and the right front side radar 21rf may serve as a "second detector".

In addition, in the present embodiment, the diagonally left front and lateral region Alf to be detected by the left front side radar 211f and the diagonally right front and lateral region Arf to be detected by the right front side radar 21rf are set so as to partially overlap with each other. In one embodiment, when it is supposed that the diagonally left front and lateral region Alf is the first search region and the diagonally right front and lateral region Arf is the second search region, the left front side radar 211f may serve as a "first detector" and the right front side radar 21rf may serve as a "second detector".

In the present embodiment, the diagonally left front and lateral region Alf to be detected by the left front side radar 211f and a diagonally left rear and lateral region Alr to be detected by the left rear side radar 211r are set so as to partially overlap with each other. In one embodiment, when it is supposed that the diagonally left front and lateral region Alf is the first search region and the diagonally left rear and lateral region Alr is the second search region, the left front side radar 211f may serve as a "first detector" and the left rear side radar 211r may serve as a "second detector".

In the present embodiment, the diagonally right front and lateral region Arf to be detected by the right front side radar 21rf and a diagonally right rear and lateral region Arr to be detected by the right rear side radar 21rr are set so as to partially overlap with each other. In one embodiment, when it is supposed that the diagonally right front and lateral region Arf is the first search region and the diagonally right rear and lateral region Arr is the second search region, the right front side radar 21rf may serve as a "first detector" and the right rear side radar 21rr may serve as a "second detector".

Furthermore, in the present embodiment, the diagonally left rear and lateral region Alr to be detected by the left rear side radar 211r and the diagonally right rear and lateral region Arr to be detected by the right rear side radar 21rr are set so as to partially overlap with each other. In one embodiment, when it is supposed that the diagonally left rear and lateral region Alr is the first search region and the diagonally right rear side and lateral region Arr is the second search region, the left rear side radar 211r may serve as a "first detector" and the right rear side radar 21rr may serve as a "second detector".

Then, the traveling environment recognizer 21d determines whether a solid object (first detected solid object) detected by the first detector and a solid object (second detected solid object) detected by the second detector are the same solid object in the overlapping region of the first search region and the second search region. The traveling environment recognizer 21d then integrates the first detected solid object and the second detected solid object that are determined to be the same solid object, to recognize the integrated first and second detected solid objects as one fusion solid object.

At that time, the traveling environment recognizer 21*d* compares a set threshold Lth with a parameter L based on the distance from the own vehicle to the first detected solid object and the distance from the own vehicle to the second detected solid object. When determining that the first detected solid object and the second detected solid object exist near the own vehicle 100, the traveling environment recognizer 21*d* recognizes the fusion solid object by using the worst value of the detection results of the respective detection results of the first and second detected solid objects. When determining that the first detected solid object and the second detected solid object exist far from the own vehicle, the traveling environment recognizer 21*d* recognizes the fusion solid object using the mean value of the detection results of the respective detection results of the first and second detected solid objects.

In one embodiment, the traveling environment recognizer 21*d* may serve as a "determiner" and a "fusion solid object recognizer".

The own vehicle position estimated by the own vehicle position estimator 12*a* of the locator calculator 12, the own vehicle lateral position deviation Xdiff and the solid object information (including the fusion solid object) obtained by the traveling environment recognizer 21*d* of the camera unit 21, etc., are read by the traveling_ECU 22. In addition, as various kinds of switches and sensors, a mode change-over switch 33 by which a driver switches between ON and OFF of automatic driving (driving assist control), a steering wheel touch sensor 34 which is configured to be turned on when the driver holds (grasps) the steering wheel, a steering torque sensor 35 configured to detect a steering torque as the driving operation amount by the driver, a brake sensor 36 configured to detect a depression amount of a brake pedal as the driving operation amount by the driver, and an accelerator sensor 37 configured to detect a depression amount of an acceleration pedal as the driving operation amount by the driver are coupled to an input side of the traveling_ECU 22.

In the traveling_ECU 22, a manual driving mode, a first driving assist mode, a second driving assist mode, and a retreat mode are set as driving modes.

In the present embodiment, the manual driving mode is a driving mode in which the driver is required to hold the steering wheel, and the driver causes the own vehicle 100 to travel according to the driving operations such as steering operation, acceleration operation, and brake operation, for example.

Similarly, also the first driving assist mode is a driving mode in which the driver is required to hold the steering wheel. That is, the first driving assist mode is, what is called, a semi-automatic driving mode in which the own vehicle 100 is caused to travel along the target traveling path by performing mainly adaptive cruise control, lane keep assist control, and lane departure prevention control in combination, through the control of the E/G_ECU 23, the PS_ECU 24, the BK_ECU 25, and the like, for example, while reflecting the driving operations by the driver.

In addition, the second driving assist mode is an automatic driving mode in which the driver is not required to hold the steering wheel and also not required to perform acceleration operation and brake operation, and the own vehicle 100 is caused to travel along the target traveling path by performing mainly the adaptive cruise control, the lane keeping assist control, and the lane departure prevention control in combination, through the control of the E/G_ECU 23, the PS_ECU 24, the BK_ECU 25 and the like, for example.

The retreat mode is a mode in which the own vehicle 100 is automatically stopped at the road side strip in the case where traveling in the second driving assist mode becomes impossible during the traveling in the second driving assist mode, and the driving operation cannot be taken over to the driver, for example (that is, in the case of failure in transition to the manual driving mode or to the first driving assist mode).

The respective driving modes set as described above are selectively switchable in the traveling_ECU 22, based on the operating situation of the mode change-over switch 33.

A throttle actuator 27 is coupled to the output side of the E/G_ECU 23.

The throttle actuator 27 is configured to cause a throttle valve of an electronic control throttle provided in a throttle body of an engine to open and close. The throttle actuator 27 causes the throttle valve to open and close by a drive signal from the E/G_ECU 23 to adjust intake air flow, and generates a desired engine output.

An electric power steering motor 28 is coupled to the output side of the PS_ECU 24. The electric power steering motor 28 imparts a steering torque to a steering mechanism by the rotational force of the motor. In the automatic driving, the electric power steering motor 28 is controlled and operated by the drive signal from the PS_ECU 24, to thereby perform the lane keeping control for keeping the traveling in the current traveling lane and the lane change control (lane change control for passing control) for moving the own vehicle 100 to the adjacent lane.

A brake actuator 29 is coupled to the output side of BK_ECU 25. The brake actuator 29 adjusts the brake hydraulic pressure to be supplied to brake wheel cylinders provided to the respective wheels. When the brake actuator 29 is driven by the drive signal from the BK_ECU 25, the braking force is generated on the respective wheels by the brake wheel cylinders, to forcibly decrease the vehicle speed.

Figure 3:
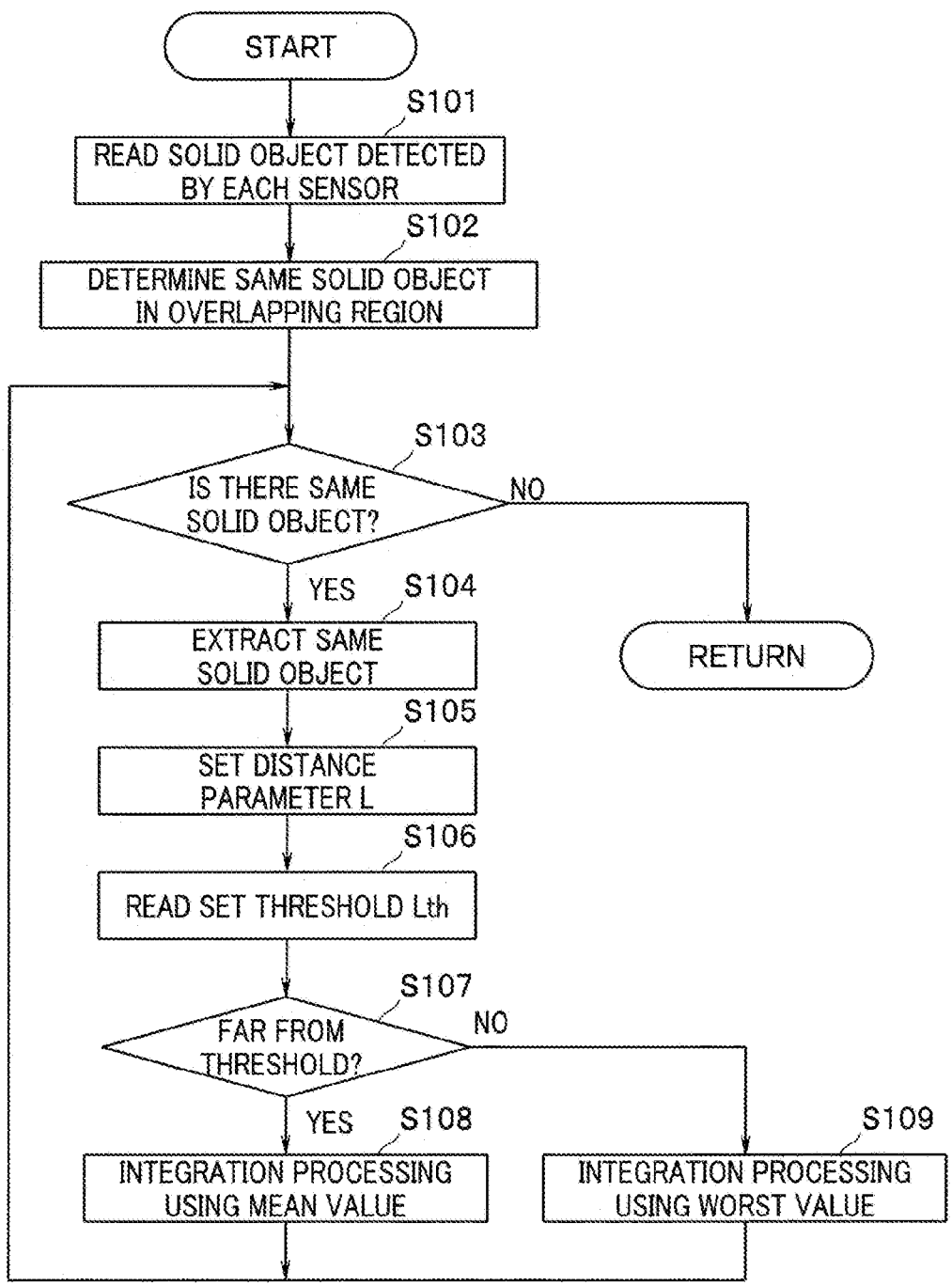
FIG. 3 is a flowchart illustrating a fusion solid object recognition routine.

Next, description will be made on recognition control of the fusion solid object that is performed by the traveling environment recognizer 21*d*, according to the flowchart of the fusion solid object recognition routine illustrated in FIG. 3.

The routine is repeatedly executed at every set time. When the routine is started, the traveling environment recognizer 21*d* first reads, in step S101, the solid object detected by each of the sensors (that is, the in-vehicle camera and each of the radars in the present embodiment).

Next, in step S102, the traveling environment recognizer 21*d* performs determination of the same solid object in the overlapping region of the two search regions (the first and second search regions).

The determination is performed on all the solid objects detected by the first detector and the second detector in each of the overlapping regions. That is, for example, in the overlapping region of the front region A1 and the diagonally left front and lateral region Alf, regarding all the combinations of the respective solid objects detected by the in-vehicle camera and the respective solid objects detected by the left front side radar 211*f*, the distances to the solid objects, the moving speeds of the solid objects, the moving directions of the solid objects, and the widths of the solid objects are respectively compared with each other, and if the differences between the distances and the like are within error ranges respectively set in advance, the solid objects are determined as the same solid object.

When the procedure proceeds from the step S102 to step S103, the traveling environment recognizer 21*d* checks whether there is a combination of the solid objects which are determined as the same solid object but have not been subjected to integration processing yet in each of the overlapping regions.

Then, in the step S103, when it is determined that there is a combination of the solid objects which are determined as the same solid object but have not been subjected to the integration processing yet, the traveling environment recognizer 21d proceeds the procedure to step S104 to extract the combination of the solid objects determined to be the same solid object but not subjected to the integration processing.

Then, when the procedure proceeds from the step S104 to step S105, the traveling environment recognizer 21d sets a distance parameter L based on the distance information of the extracted combination of the solid objects determined as the same solid object.

The distance parameter L is set based on the expression (1) below, for example.

$$L=\text{(distance to solid object)}+\text{(relative speed}\times\text{time parameter)} \quad (1)$$

In the expression (1), among the distances from the own vehicle 100 to the respective solid objects that constitute the combination of solid objects as the same solid object, for example, the worst value (distance near the own vehicle 100) from the perspective of safe traveling is used as the distance to the solid object. Alternatively, a mean value of the distances from the own vehicle 100 to the respective solid objects that constitute the combination of the solid objects as the same solid object may be used as the distance to the solid object. Note that the distance to the solid object is a positive value when the solid object exists ahead of the own vehicle 100 and is a negative value when the solid object exits behind the own vehicle 100.

In addition, as the relative speed, for example, among the relative speeds between the own vehicle 100 and the respective solid objects that constitute the combination of the solid objects as the same solid object (with regard to the solid object ahead of the own vehicle 100, (speed of the solid object)−(own vehicle speed), and with regard to the solid object behind the own vehicle 100, (own vehicle speed)−(speed of the solid object)), the worst value (value having a smaller absolute value) from the perspective of safe traveling is used. Alternatively, a mean value of the relative speeds between the own vehicle and the respective solid objects may be used as the relative speed.

In addition, one second is set as the time parameter, for example.

Note that the distance parameter L can be obtained without performing correction based on the relative speed as indicated in the expression (1).

Figure 4:
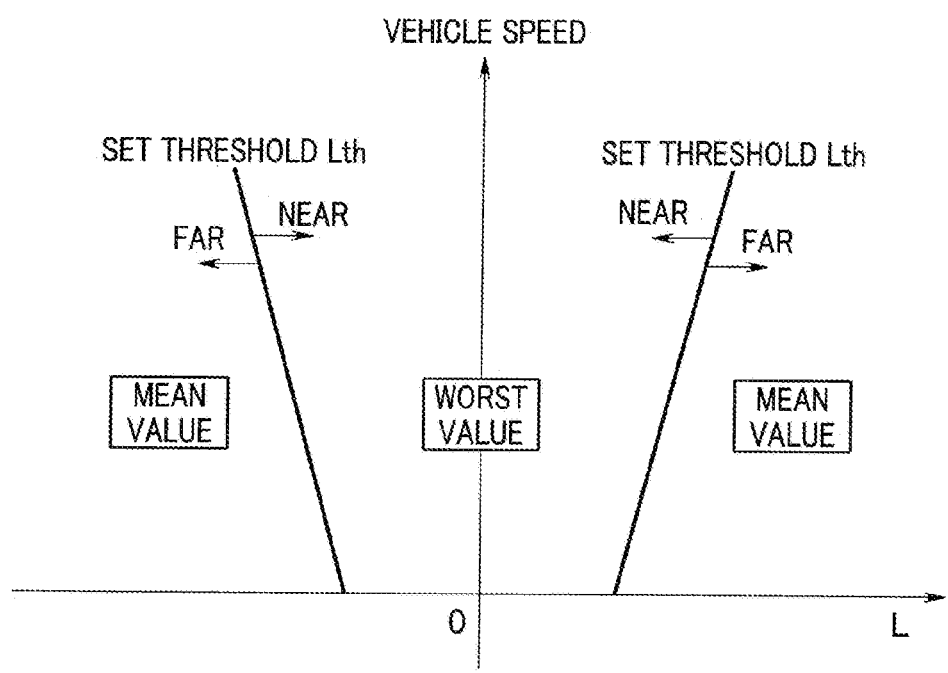
FIG. 4 is an explanatory view for determining whether a detected solid object exists near an own vehicle or far from the own vehicle, based on a distance parameter and a vehicle speed.

When the procedure proceeds from step S105 to step S106, the traveling environment recognizer 21d reads a set threshold Lth with respect to the distance parameter L. As illustrated in FIG. 4, for example, the set threshold Lth which is a positive value for the detected solid object ahead of the own vehicle 100 and the set threshold Lth which is a negative value for the detected solid object behind the own vehicle 100 are set as the set threshold Lth. In the present embodiment, the respective set thresholds Lth are variable depending on the own vehicle speed. As the own vehicle speed becomes higher, the set threshold Lth as the positive value becomes larger and the set threshold Lth as the negative value becomes smaller. Note that the set thresholds Lth may be fixed values with respect to the own vehicle speed.

When the procedure proceeds from the step S106 to step S107, the traveling environment recognizer 21d compares the distance parameter L and the set thresholds Lth, to check whether the first detected solid object and the second detected solid object exist far from the own vehicle. As illustrated in FIG. 4, when the distance parameter L is larger than the positive set threshold Lth, or the distance parameter L is smaller than the negative set threshold Lth, it is determined that the first detected solid object and the second detected solid object exist far from the own vehicle 100. On the other hand, when the distance parameter L is not smaller than the negative set threshold Lth and not larger than the positive set threshold Lth, it is determined that the first detected solid object and the second detected solid object exist near the own vehicle.

Then, when it is determined that the first detected solid object and the second detected solid object exist far from the own vehicle 100 in the step S107, the traveling environment recognizer 21d proceeds the procedure to step S108 to recognize the fusion solid object using the mean value of the respective detection results of the first detected solid object and the second detected solid object, and thereafter returns to the step S103.

Figure 5:
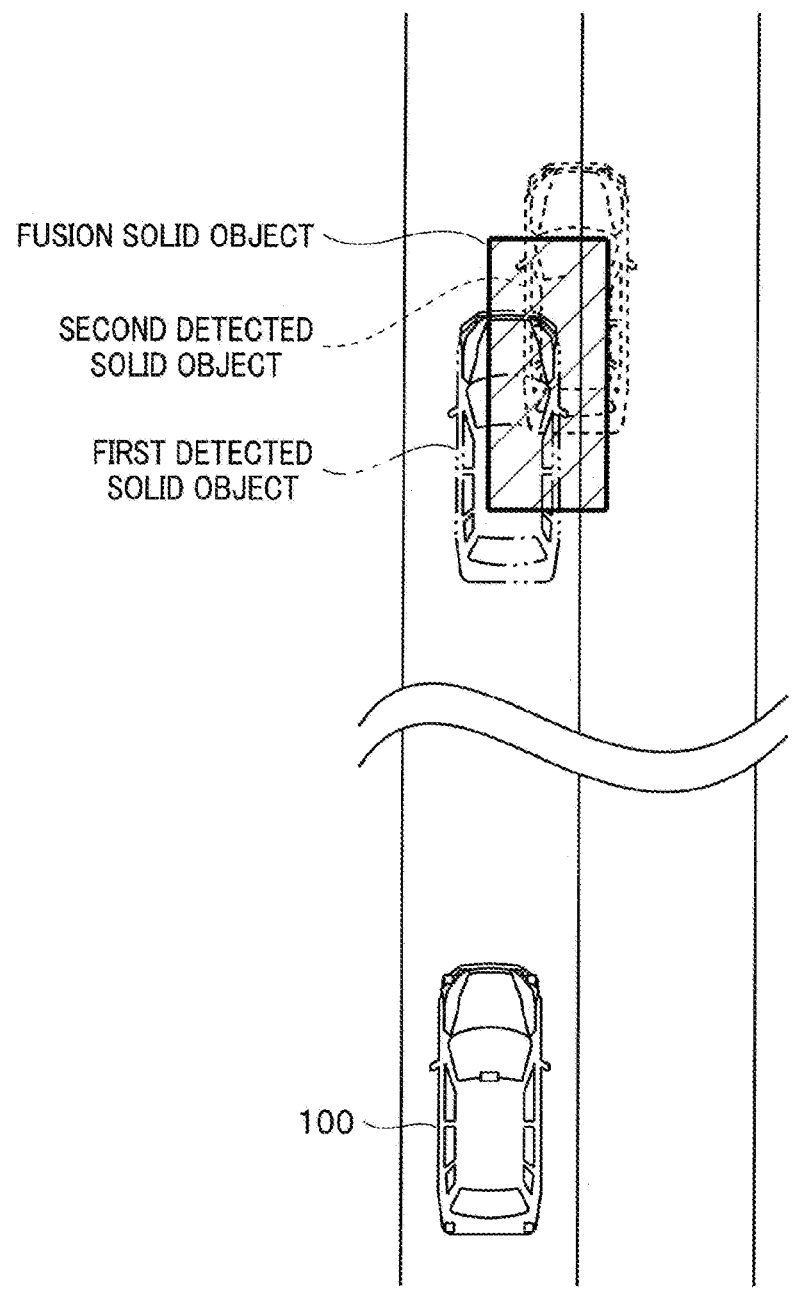
FIG. 5 is an explanatory view of a fusion solid object recognized near the own vehicle.

That is, in the step S108, the traveling environment recognizer 21d sets, as illustrated in FIG. 5, for example, the mean value of the width of the first detected solid object and the width of the second detected solid object, as the width of the fusion solid object. In addition, as the position of a representative point of the fusion solid object, the mean value of the position of the representative point of the first detected solid object and the position of the representative point of the second detected solid object is set. Furthermore, as the speed of the fusion solid object, the mean value of the speed of the first detected solid object and the speed of the second detected solid object is set. Note that other pieces of information are set in the similar manner, and regarding the information detected only for either one of the first detected solid object and the second detected solid object, the information is set.

On the other hand, when it is determined that the first detected solid object and the second detected solid object exist near the own vehicle 100 in the step S107, the traveling environment recognizer 21d proceeds the procedure to step S109, to recognize the fusion solid object using the worst value of the first detected solid object and the second detected solid object, and thereafter returns to the step S103.

Figure 6:
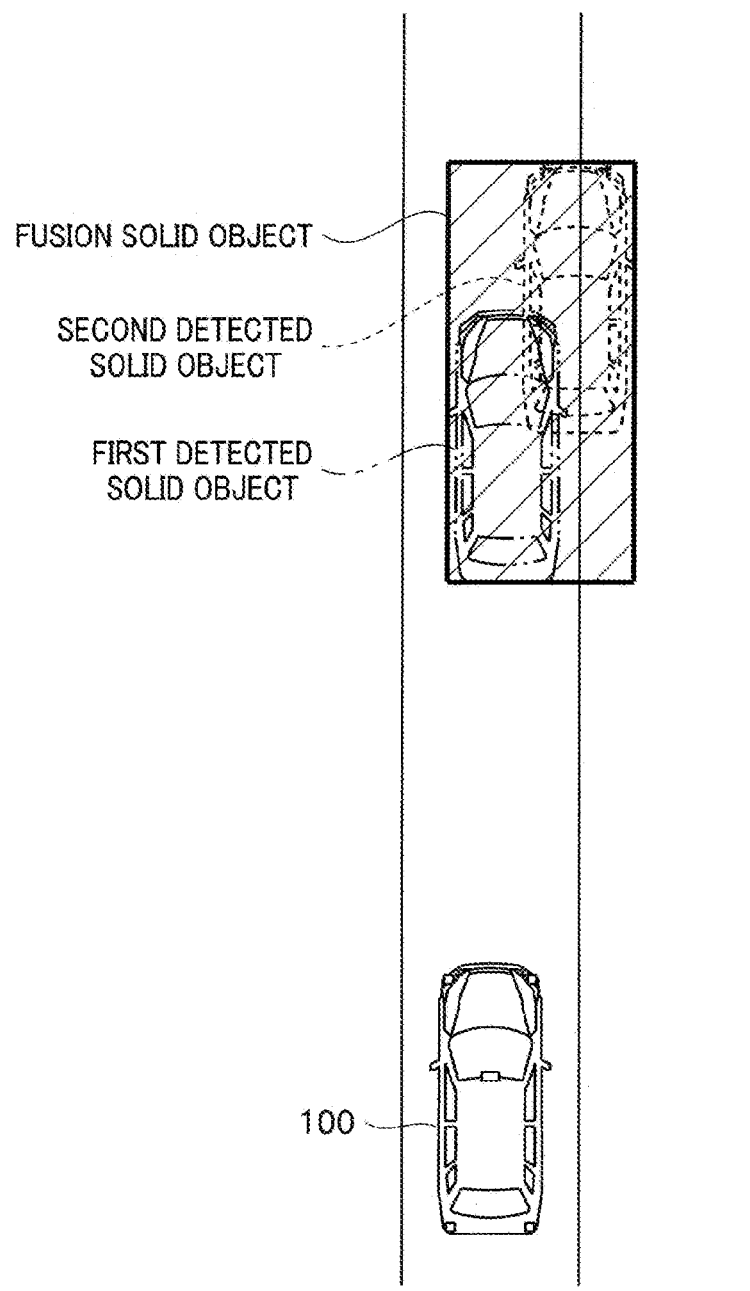
FIG. 6 is an explanatory view of a fusion solid object recognized far from the own vehicle.

That is, in the step S109, as illustrated in FIG. 6, for example, the traveling environment recognizer 21d sets, as the width of the fusion solid object, the width from the leftmost end of either one of the first detected solid object and the second detected solid object to the rightmost end of either one of the first detected solid object and the second detected solid object. In addition, as the representative point of the fusion solid object, the point nearest to the own vehicle 100 of the representative points of the first detected solid object and the second detected solid object is set. Furthermore, as the speed of the fusion solid object, among the speeds of the first detected solid object and the second detected solid object, the slowest speed is set for the fusion solid object ahead of the own vehicle 100 and the fastest speed is set for the fusion solid object behind the own vehicle 100. Note that other pieces of information are also set based on the similar perspective, and regarding the information detected only for either one of the first detected solid object and the second detected solid object, the information is set. With such a procedure, a safety margin is reflected in the respective pieces of recognition information of the fusion solid object.

In addition, when it is determined that there is no combination of the solid objects that are determined as the same solid object but have not been subjected to the integration processing yet in the step S103, the traveling environment recognizer 21d causes the procedure to exit the routine.

Note that the respective sold objects that have not been integrated in the fusion solid object recognition routine are recognized as the solid objects detected by the individual sensors.

According to the embodiment described above, based on the comparison between the set thresholds Lth and the parameter L based on the distance from the own vehicle to the first detected solid object and the distance from the own vehicle to the second detected solid object, when it is determined that the first detected solid object and the second detected solid object exist near the own vehicle 100, the fusion solid object is recognized by using the worst value of the respective detection results of the first and second detected solid objects, and when it is determined that the first detected solid object and the second detected solid object exist far from the own vehicle, the fusion solid object is recognized by using the mean value of the respective detection results of the first and second detected solid objects, to thereby be capable of recognizing the fusion solid object by efficiently and effectively using the detection information acquired by a plurality of sensors.

That is, when the fusion solid object exists at a position far from the own vehicle 100 at which the possibility of requiring emergency collision avoidance control of the own vehicle 100 is low, the fusion solid object is recognized by using the mean value of the respective detection results of the first detected solid object and the second detected solid object, to thereby be capable of suppressing excessive driving control with respect to the fusion solid object. On the other hand, when the fusion solid object exists at a position near the own vehicle 100 at which the possibility of requiring emergency collision avoidance control of the own vehicle 100 is high, the fusion solid object is recognized by using the worst value (the severest value at which there is a possibility of collision between the own vehicle and the fusion solid object) of the respective detection results of the first detected solid object and the second detected solid object, to thereby be capable of achieving driving control taking the safety margin sufficiently into consideration.

At that time, by setting the set thresholds Lth to be variable depending on the own vehicle speed, it is possible to judge whether the first and second detected solid objects exist far from or near the own vehicle 100 according to the actual traveling state of the own vehicle 100.

In addition, by correcting the distance parameter based on the relative speeds between the own vehicle and the solid objects, it is possible to judge whether the first and the second detected solid objects exist far from or near the own vehicle 100 according to the traveling environment of the own vehicle 100.

In the above-described embodiment, description has been made by taking the fusion of the radars and the in-vehicle camera using the stereo camera as an example. However, it is needless to say that a monocular camera, a sonar and the like may be used as the sensors.

Note that each of the locator unit 11, the camera unit 21 and the respective ECUs 22 to 26 that constitute the driving assist apparatus 1 includes a processor including a central processing unit (CPU), storage devices such as a ROM, RAM, and the like. The entire or a part of the configurations of the plurality of circuitries of the processor may be executed by software. Various kinds of programs corresponding to the respective functions stored in the ROM may be read and executed by the CPU, for example.

Furthermore, the entire or a part of the functions of the processor may be configured by a logical circuit or an analog circuit. The processing of the various kinds of programs may be executed by an electronic circuit such as an FPGA.

The technology is not limited to the above-described embodiment, but various modifications are possible at the practical stage without departing from the gist of the technology. Furthermore, the above embodiment includes various stages of the technology at, and various technologies can be extracted by appropriately combining a plurality of disclosed components.

For example, even if some of the components are removed from all the components shown in the above embodiment, a configuration from which the components are eliminated can be extracted as a technology insofar as the configuration can solve the recited problem and attain the recited effects of the technology.

The traveling environment recognizer 21d illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling environment recognizer 21d including the functions as the determiner and the fusion solid object recognizer. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A traveling environment recognition apparatus installed in a vehicle, the traveling environment recognition apparatus comprising:
    a first detector configured to detect a first solid object that is in a first search region set outside of the vehicle;
    a second detector configured to detect a second solid object that is in a second search region set outside of the vehicle such that at least a part of the second search region overlaps with the first search region;
    a determiner configured to determine whether the first solid object detected by the first detector and the second solid object detected by the second detector are a same solid object, in response to determining that the first solid object and the second solid object are detected in an overlapping region of the first search region and the second search region; and a fusion solid object recognizer configured to integrate the first solid object and the second solid object which are determined to be the same solid object by the determiner, and to recognize the integrated first and second solid objects as one fusion solid object, wherein the fusion solid object recognizer determines a first value, wherein the first value is i) a mean value of a first distance from the vehicle to the first solid object and a second distance from the vehicle to the second solid object, or ii) one of the first distance and the second distance, the one of the first distance and the second distance being shorter than another of the first distance and the second distance, determines a parameter based on the first value, wherein the parameter becomes greater as the first value becomes greater, recognizes a distance from the vehicle to the fusion solid object by using the mean value of the first distance and the second distance when the parameter is greater than a set threshold, and recognizes the distance from the vehicle to the fusion solid object by using the one of the first distance and the second distance when the parameter is equal to or smaller than the set threshold.

2. The traveling environment recognition apparatus according to claim 1, wherein the set threshold is variable depending on a vehicle speed of the vehicle.

3. The traveling environment recognition apparatus according to claim 1, wherein the parameter is corrected on a basis of a relative speed between the vehicle and the first solid object and a relative speed between the vehicle and second solid object.

4. The traveling environment recognition apparatus according to claim 2, wherein the parameter is corrected on a basis of a relative speed between the vehicle and the first solid object and a relative speed between the vehicle and second solid object.

5. A traveling environment recognition apparatus installed in a vehicle, the traveling environment recognition apparatus comprising:

first detector configured to detect a first solid object that is in a first search region set outside the vehicle;

second detector configured to detect a second solid object that is in a second search region set outside of the vehicle such that at least a part of the second search region overlaps with the first search region; and circuitry configured to:

determine whether the first solid object detected by the first detector and the second solid object detected by the second detector are a same solid object, in response to determining that the first solid object and the second solid object are detected in an overlapping region of the first search region and the second search region; and integrate the first solid object and the second solid object which are determined to be the same solid object, and to recognize the integrated first and second solid objects as one fusion solid object, wherein the circuitry determines a first value, wherein the first value is i) a mean value of a first distance from the vehicle to the first solid object and a second distance from the vehicle to the second solid object, or ii) one of the first distance and the second distance, the one of the first distance and the second distance being shorter than another of the first distance and the second distance, determines a parameter based on the first value, wherein the parameter becomes greater as the first value becomes greater, recognizes a distance from the vehicle to the fusion solid object by using the mean value of the first distance and the second distance when the parameter is greater than a set threshold, and recognizes the distance from the vehicle to the fusion solid object by using the one of the first distance and the second distance when the parameter is equal to or smaller than the set threshold.

6. The traveling environment recognition apparatus according to claim 1, wherein the fusion solid object recognizer when the parameter is greater than the set threshold, i) recognizes a right end position of the fusion solid object in a width direction of the vehicle by using a mean value of a first right end position of the first solid object in the width direction of the vehicle and a second right end position of the second solid object in the width direction of the vehicle and ii) recognizes a left end position of the fusion solid object in the width direction of the vehicle by using a mean value of a first left end position of the first solid object in the width direction of the vehicle and a second left end position of the second solid object in the width direction of the vehicle, and when the parameter is equal to or smaller than the set threshold, i) recognizes the right end position of the fusion solid object in the width direction of the vehicle by using one of the first right end position and the second right end position being a most right of the first right end position and the second right end position and ii) recognizes the left end position of the fusion solid object in the width direction of the vehicle by using one of the first left end position and the second left end position being a most left of the first left end position and the second left end position.

7. The traveling environment recognition apparatus according to claim 1, wherein the fusion solid object recognizer determines the parameter based on the first value and a second value, the second value is a decreasing amount of the first value per predetermined time, and the parameter becomes greater as the second value becomes greater.

8. The traveling environment recognition apparatus according to claim 6, wherein the fusion solid object recognizer determines the parameter based on the first value and a second value, the second value is a decreasing amount of the first value per predetermined time, and the parameter becomes greater as the second value becomes greater.

9. The traveling environment recognition apparatus according to claim 1, wherein the fusion solid object recognizer determines the set threshold based on a vehicle speed of the vehicle so that the set threshold becomes greater as the vehicle speed of the vehicle is higher.

10. The traveling environment recognition apparatus according to claim 6, wherein the fusion solid object recognizer determines the set threshold based on a vehicle speed of the vehicle so that the set threshold becomes greater as the vehicle speed of the vehicle is higher.

11. The traveling environment recognition apparatus according to claim 7, wherein the fusion solid object recognizer determines the set threshold based on a vehicle speed of the vehicle so that the set threshold becomes greater as the vehicle speed of the vehicle is higher.

12. The traveling environment recognition apparatus according to claim 8, wherein the fusion solid object recognizer determines the set threshold based on a vehicle speed of the vehicle so that the set threshold becomes greater as the vehicle speed of the vehicle is higher.

13. A traveling environment recognition apparatus installed in a vehicle, the traveling environment recognition apparatus comprising:
   a first detector configured to detect a first solid object that is in a first search region set outside of the vehicle;
   a second detector configured to detect a second solid object that is in a second search region set outside of the vehicle such that at least a part of the second search region overlaps with the first search region; and
   circuitry configured to:
      determine whether the first solid object detected by the first detector and the second solid object detected by the second detector are a same solid object, in response to determining that the first solid object and the second solid object are detected in an overlapping region of the first search region and the second search region; and
      integrate the first solid object and the second solid object which are determined to be the same solid object by the determiner, and to recognize the integrated first and second solid objects as one fusion solid object,
   wherein the circuitry
      determines a first value, the first value is i) a mean value of a first distance between from the vehicle to the first solid object and a second distance from the vehicle to the second solid object, or ii) one of the first distance and the second distance, the one of the first distance and the second distance being shorter than another of the first distance and the second distance,
      determines a parameter, based on the first value, wherein the parameter becomes greater as the first value becomes greater,
      when the parameter is greater than a set threshold, i) recognizes a right end position of the fusion solid object in a width direction of the vehicle by using a mean value of a first right end position of the first solid object in the width direction of the vehicle and a second right end position of the second solid object in the width direction of the vehicle and ii) recognizes a left end position of the fusion solid object in the width direction of the vehicle by using a mean value of a first left end position of the first solid object in the width direction of the vehicle and a second left end position of the second solid object in the width direction of the vehicle, and
      when the parameter is equal to or smaller than the set threshold, i) recognizes the right end position of the fusion solid object in the width direction of the vehicle by using one of the first right end position and the second right end position being a most right of the first right end position and the second right end position and ii) recognizes the left end position of the fusion solid object in the width direction of the vehicle by using one of the first left end position and the second left end position being a most left of the first left end position and the second left end position.

14. The traveling environment recognition apparatus according to claim 13, wherein the circuitry determines the parameter based on the first value and a second value, the second value is a decreasing amount of the first value per predetermined time, the parameter becomes greater as the second value becomes greater.

15. The traveling environment recognition apparatus according to claim 13, wherein the circuitry determines the set threshold based on a vehicle speed of the vehicle so that the set threshold becomes greater as the vehicle speed of the vehicle is higher.

16. The traveling environment recognition apparatus according to claim 14, wherein the circuitry determines the set threshold based on a vehicle speed of the vehicle so that the set threshold becomes greater as the vehicle speed of the vehicle is higher.

* * * * *